United States Patent
Finley

(10) Patent No.: US 12,404,156 B2
(45) Date of Patent: Sep. 2, 2025

(54) HOIST AND SUPPLEMENTAL SUPPORT SYSTEM

(71) Applicant: Alfred L. Finley, Fort Worth, TX (US)

(72) Inventor: Alfred L. Finley, Fort Worth, TX (US)

(*) Notice: Subject to any disclaimer, the term of this patent is extended or adjusted under 35 U.S.C. 154(b) by 101 days.

(21) Appl. No.: 17/899,113

(22) Filed: Aug. 30, 2022

(65) Prior Publication Data

US 2022/0411241 A1  Dec. 29, 2022

Related U.S. Application Data

(63) Continuation of application No. 17/009,201, filed on Sep. 1, 2020, now Pat. No. 11,453,580.

(51) Int. Cl.
*B66F 3/36* (2006.01)
*B60P 1/16* (2006.01)
*B60P 1/28* (2006.01)

(52) U.S. Cl.
CPC ............. *B66F 3/36* (2013.01); *B60P 1/162* (2013.01); *B60P 1/283* (2013.01); *B66F 2700/052* (2013.01)

(58) Field of Classification Search
CPC ........ B66F 7/02; B66F 7/0608; B66F 7/0616; B66F 7/18; B66F 7/22; B66F 17/00; B66F 17/006; B66F 3/36; B66F 2700/052; B66F 7/065–0691; B60P 1/283; B60P 1/162; B60P 1/16; B60P 1/00; B60P 1/045; B60P 1/28; B60P 1/30; B60P 3/122
See application file for complete search history.

(56) References Cited

U.S. PATENT DOCUMENTS

| | | | | |
|---|---|---|---|---|
| 3,317,004 A | * | 5/1967 | Harrison, Jr. | ......... B66F 7/0641 254/91 |
| 3,811,338 A | * | 5/1974 | Federspiel | .............. B60P 1/283 74/527 |
| 2005/0262908 A1 | * | 12/2005 | Parker | ................... G05G 1/082 70/177 |

* cited by examiner

*Primary Examiner* — Edward F Landrum
*Assistant Examiner* — Sarah Akyaa Fordjour
(74) *Attorney, Agent, or Firm* — Brian K. Yost; Decker Jones, PC

(57) ABSTRACT

A support assembly comprises a bracket, a blocking member, and a spring. The blocking member is adapted to slidingly move within a through opening of a support member. The blocking member is adapted to be selectively moved from a supporting position to a non-supporting position. The spring is adapted to bias the blocking member towards the non-supporting position. In certain embodiments, the bracket is adapted to retain the blocking member at least partially within the through opening when the bracket is mounted to a hoist. In certain embodiments, the blocking member comprises a handle comprising a pin axially aligned within a compression spring and the bracket comprises a notch adapted to receive the handle.

19 Claims, 4 Drawing Sheets

HOIST AND SUPPLEMENTAL SUPPORT SYSTEM

This application is a continuation application of U.S. application Ser. No. 17/009,201, filed Sep. 1, 2020, the contents of which are incorporated herein by reference and of which Applicant claims the benefit.

BACKGROUND OF THE INVENTION

1. Field of the Invention

The present invention relates to power hoists and more specifically to a low or minimum profile hoist and supplemental support system adapted to prevent the hoist from collapsing.

2. Description of the Prior Art

Lifts or hoists are used in a variety of applications, including, for, example, use in dump truck bodies. There are a number of hoist types known in the art, including scissor type hoists and telescopic hoists. The scissor type hoist provides great stability but is less efficient than the telescopic hoist. The telescopic hoist, though more efficient and, in many cases, more powerful, is less stable than the scissor type hoist, particularly when lifting uneven loads. Combination hoists were developed to take advantage of the stability of scissor variety hoists and the strength of the telescopic hoists. Combination hoists generally comprise an upper frame assembly pivotally coupled to a lower frame assembly, and one or more hydraulic arms extending from a base to the upper arm. Extension of the hydraulic arms results in the raising of the lower and upper frames, which in turn causes the raising of the bed of the dump trailer. Conversely, lowering the lower and upper frames involves retracting the hydraulic arm or arms.

As long as sufficient hydraulic pressure is maintained within the hydraulic system, the dump bed or other object being supported will remain in an extended position. However, hydraulic systems can lose hydraulic pressure either intentionally or accidentally. When hydraulic pressure is released from the lifting portion of the hoist, the lower and upper frames will lower and begin to collapse. A sudden release of such hydraulic pressure can result in a sudden collapse of the hoist that can result in severe injury of death.

What is needed is a simple and reliable system that will prevent a hoist from collapsing upon the release of hydraulic pressure.

SUMMARY OF THE INVENTION

The hoist generally comprises a base, lower arms, upper arms, hydraulic cylinder assembly, upper arms crossmember, and one or supplemental support systems. The base is adapted to be coupled to a frame of a vehicle such as a dump truck. Pivotally coupled to the base are lower arms and the hydraulic cylinder assembly. In the preferred embodiment, a base axle is threaded through openings in lower arm proximal ends and a hydraulic cylinder lower retainer. Pivotally coupled to distal ends of the lower arms are respective upper arms. The upper arms of the preferred embodiment are stabilized by upper arms crossmember which spans across upper ends of the upper arms and bushing which spans between lower ends of the upper arms. An arm axle threads through lower arm upper through openings and upper arm lower through openings.

The one or more supplemental support systems each comprise a bracket, a blocking member/pin, a spring and a pin handle. The pin is adapted to be slidingly positioned within a pin through opening in the lower arm, and in some embodiments, through a central bracket through opening. The bracket of the preferred embodiment is adapted to extend orthogonally from an outside portion of the lower arm and comprises an angular "U" configuration. In other embodiments, the bracket comprises a closed rectangular configuration. In angular "U" configuration embodiments, legs of the bracket are directly connected to the outside portion of the lower arm. In closed rectangular configuration embodiments, a distal short side of the rectangle is closed and comprises the central bracket through opening through which the pin is adapted to slidingly move. Thus, the supplemental support system is adapted be either built into the hoist or serve as an accessory that can be added to a conventional hoist as an accessory.

The pin handle extends orthogonally from an outside end of the pin. The spring of the preferred embodiment is an open coil helical compression spring. The spring surrounds a portion of the pin. With this configuration, legs of the bracket are coupled to the outside portion of the lower arm such that the bracket legs straddle the pin positioned in the pin through opening and the spring. The bracket further comprises a notch adapted to receive the pin handle when the pin is in a supporting position. The pin is adapted to slide within the pin through opening such that, when the pin is in the supporting position, a distal end of pin is positioned beneath upper arm.

The hydraulic cylinder assembly comprises a barrel and a piston rod, the piston rod being adapted to extend and retract. The piston rod is structured and arranged to be removeably coupled with a rod receiver portion. A rod receiver crossmember is pivotally coupled to upper arms via rod receiver crossmember axle such that the rod receiver portion is axially aligned with the rod receiver crossmember when coupled with the rod receiver crossmember.

In preferred embodiments, the upper arm comprises a pad. This pad is positioned between the distal end of pin and upper arm when the pin is in the supporting position.

In preferred embodiments, the hoist comprises tubular lower arms and upper arms.

In preferred embodiments the supplemental support system is coupled to an upper leg such that the pin, in the supporting position rests against the lower leg.

In preferred embodiments, the hoist and supplemental support are formed from heavy duty steel adapted to withstand heavy loads.

DESCRIPTION OF THE PREFERRED EMBODIMENT

Referring to FIGS. 1-5, & 7, there is shown the hoist 12 and supplemental support system 14 in accordance with preferred embodiments. As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment of the present disclosure. Thus, the appearances of such phrases in various places throughout this specification are not necessarily all referring to the same embodiment. Furthermore, the particular features, structures, or characteristics may be combined in any suitable manner on one or more embodiments without limitation. The detailed description illustrates by way of example, not by way of limitation, the principles of the invention. This description will clearly enable one skilled in the art to make and use the invention, and describes several embodiments, adaptations, variations, alternatives, and uses of the invention, including what is presently believed to be the best mode of carrying out the invention.

Figure 1:
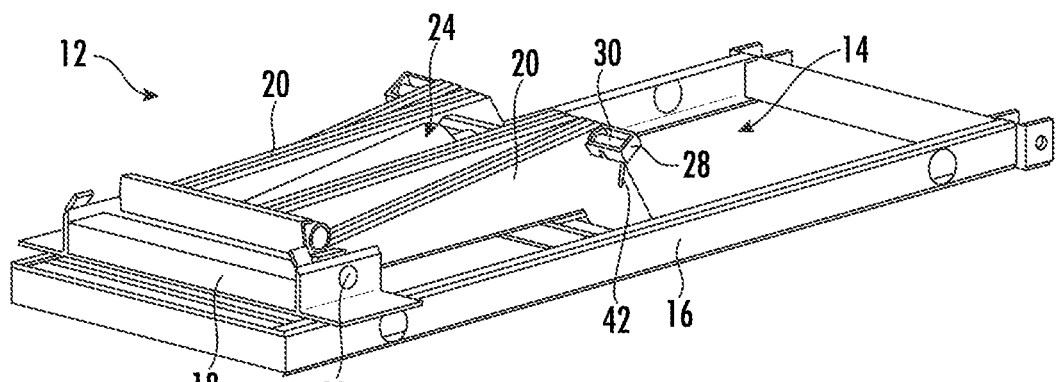
FIG. 1 is a front and right-side isometric view of the hoist in a retracted condition, in accordance with a preferred embodiment.
Figure 2:
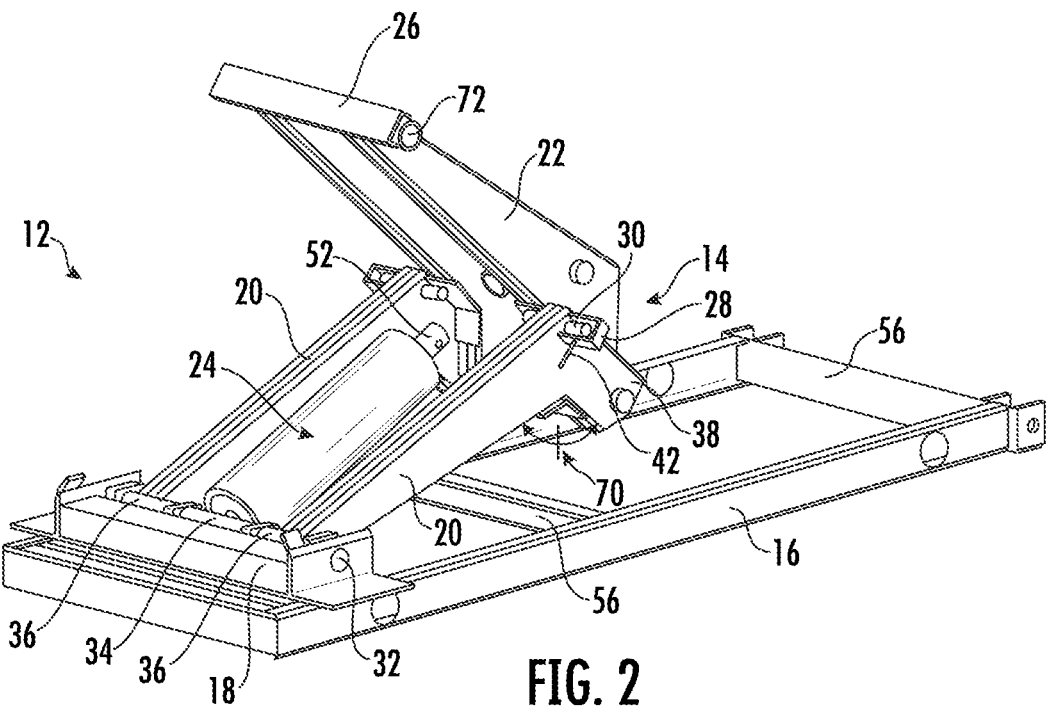
FIG. 2 is a front and right-side isometric view of the hoist in an extended condition, in accordance with a preferred embodiment.

Referring to FIGS. 1 and 2, the hoist 12 generally comprises a base 18, lower arms 20, upper arms 22, hydraulic cylinder assembly 24, upper arms crossmember 26, and one or more supplemental support systems 14. The base 18 is adapted to be mounted to a frame 16, such as the frame 16 of a vehicle comprising, for example, a rectangular frame 16 configuration and one or more frame 16 crossmembers 56.

Pivotally coupled to the base 18 are lower arms 20, 20 and the hydraulic cylinder assembly 24. In the preferred embodiment, a base axle 32 is threaded through openings (not shown) in lower arm proximal ends 36 and a hydraulic cylinder lower retainer 34. Pivotally coupled to distal ends 38 of the lower arms 20, 20 are respective upper arms 22, 22. The upper arms 22, 22 of the preferred embodiment are stabilized by upper arms crossmember 26 which spans across upper ends of the upper arms 22, 22 and further stabilized by a bushing 66 which spans between lower ends of the upper arms 22, 22. An arm axle 30 threads through lower arm upper through openings 68 and upper arm lower through openings 70. The crossmember comprises a crossmember through opening 72 adapted to receive a crossmember axle (not shown) that can be mounted between frame members of a truck bed (not shown).

In the preferred embodiment, each lower arm 20, 20 comprises an angle 70 such that each lower arm 20, 20 is not straight. Rather, the distal end 38 of each lower arm 20, 20 extends downward relative to longitudinal axis of the lower arm 20. Each lower arm 20, 20 further comprises a tapering configuration such that each lower arm 20, 20 is narrower in side profile nearer the proximal end 36 than more distal to the proximal end 36. Each upper arm 22, 22 of the preferred embodiment comprises a tapering configuration such that each upper arm 22, 22 is narrower in side profile nearer the upper arms crossmember 26 than farther from the upper arms crossmember 26.

Figure 6:
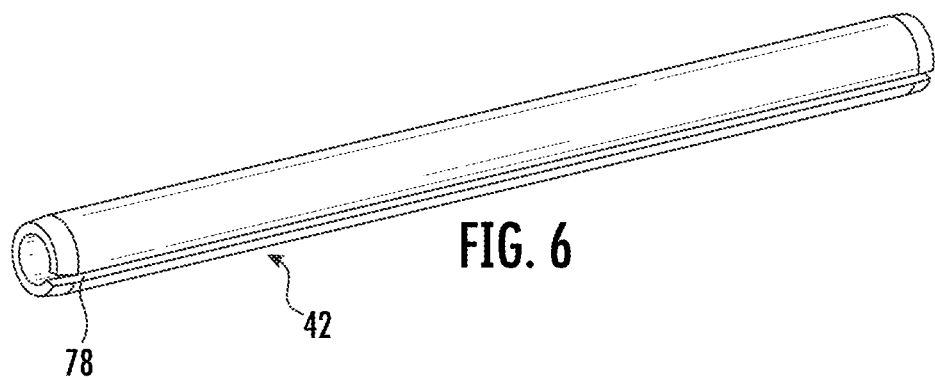
FIG. 6 is an isometric view of the handle of the supplemental support system in accordance with a preferred embodiment.
Figure 7:
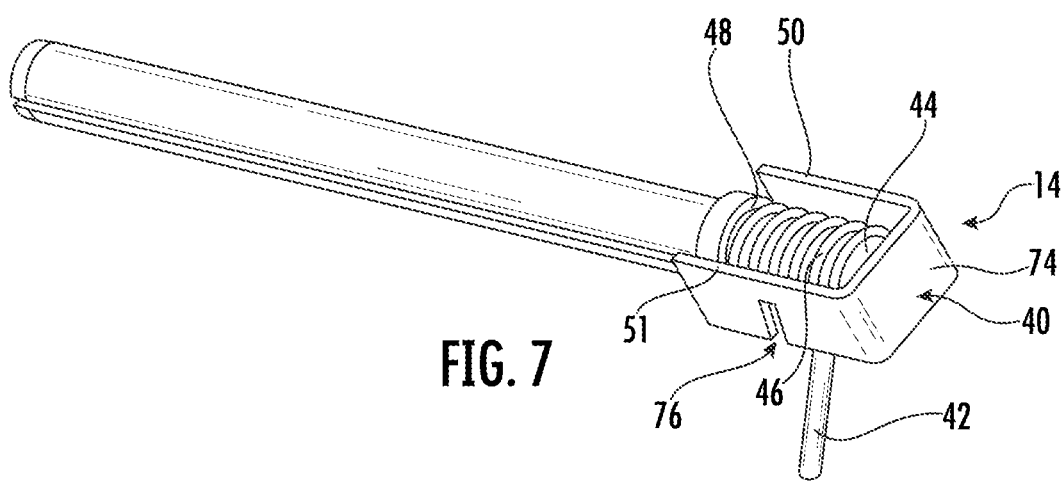
FIG. 7 is an isometric view of the supplemental support system in accordance with a preferred embodiment.

As best seen in FIGS. 3-5, and 7, the one or more supplemental support systems 14 each comprise bracket 40, blocking member 44 (hereinafter referred to as pin 44), spring 46 and pin handle 42. The pin 44 is adapted to be slidingly positioned within a pin through opening 48 in the lower arm 20. Referring to FIG. 6, the handle 42 of certain embodiments is a handle 42 comprising slot 78 adapted to receive a shim (not shown) adapted to maintain the handle 42 in position within the pin 44. The bracket 40 of the preferred embodiment is adapted to extend orthogonally from an outside portion of the lower arm 20, 20 and comprises a "U" bracket 40 comprising an angular "U" configuration. In other embodiments, the bracket 40 comprises a closed rectangular configuration. In angular "U" configuration embodiments, legs 50, 51 of the bracket 40 are directly connected to an outside portion of the lower arm 20. In closed rectangular configuration embodiments of the bracket 40, a distal short side of the rectangle is closed and comprises a central bracket through opening through which the pin 44 is adapted to slidingly move. Thus, the supplemental support system 14 is adapted be either and built into the hoist 12 or serve as an accessory that can be added to a conventional hoist.

The pin handle 42 extends orthogonally from an outside end portion of the pin 44. In preferred embodiments, the pin handle 42 extends through opposite sides of the pin 44. With this configuration, the spring 46 is retained in general axial alignment with the pin 44. In alternative embodiments, two pin handles 42, 42 can be arranged such that no through pin opening is necessary.

The spring 46 of the preferred embodiment is an open coil helical compression spring 46. In some embodiments, the spring 46 may have a torsion component. The spring 46 surrounds a portion of pin 44. The spring 46 biases the pin 44 towards an end portion 74 of bracket 40. The torsion attributes of the spring 46 of certain embodiments rotationally biases the pin handle 42 upwards toward a bracket leg 51 comprising a notch 76.

The end portion 74 and pin through opening 48 retain the pin 44 in axial alignment with the pin through opening 48. With this configuration, the legs 50, 51 of the bracket 40 are coupled to the outside portion of the lower arm 20 such that the bracket legs 50, 51 straddle the pin 44 positioned in the pin through opening 48 and spring 46.

Figure 3:
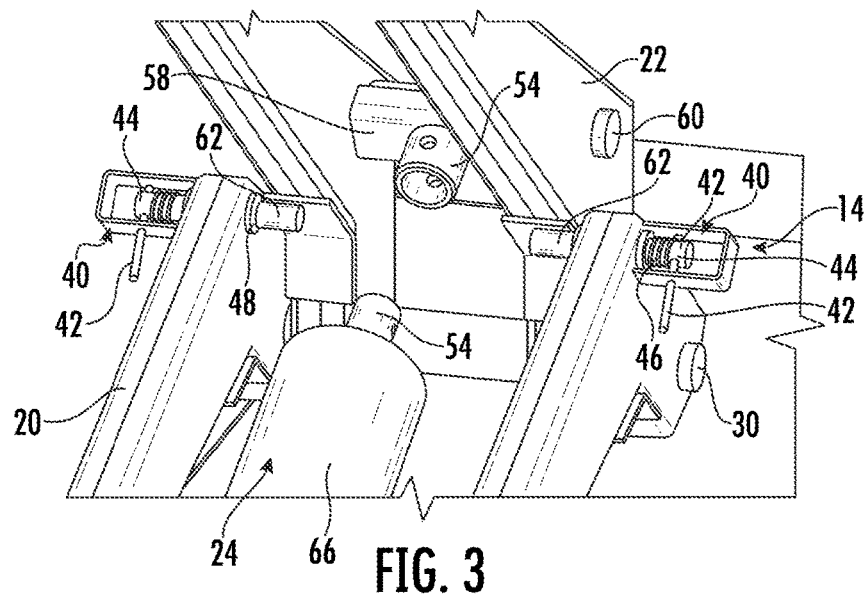
FIG. 3 is a front and right-side isometric view of the supplemental support system portions of the hoist of FIGS. 1 and 2 with the pins in the supporting position.

The notch 76 of the bracket 40 is adapted to receive the pin handle 42 when the pin 44 is in a supporting position, as shown, for example, in FIG. 3. The pin 44 is adapted to slide within pin through opening 48 such that, when the pin 44 is in the supporting position a distal end 62 of pin 44 is positioned beneath upper arm 22 and when the pin 44 is in a non-supporting position, as shown, for example, in FIG. 4, the distal end 62 of the pin 44 is adjacent to the lower arm 20 and out of a path of downward movement of the upper arm 22.

In preferred embodiments, the upper arm 22 comprises a pad 64. This pad 64 is positioned between the distal end 62 of pin 44 and upper arm 22 when the pin 44 is in the supporting position.

The hydraulic cylinder assembly 24 comprises a barrel 66 and a piston rod 52, the piston rod 52 being adapted to extend and retract in a manner well known in the art. The piston rod 52 is structured and arranged to be removeably coupled with rod receiver portion 54 (the piston rod 52 and rod receiver portion 54 shown in an uncoupled condition in FIGS. 2-4). Rod receiver crossmember 58 is pivotally coupled to upper arms 22, 22 via rod receiver crossmember axle 60 (FIG. 3) such that the rod receiver portion 54 is axially aligned with the rod receiver crossmember 58 when coupled with the rod receiver crossmember 58.

Although a hydraulic cylinder assembly 24 is described herein as the assembly used to move the hoist 12 to and between the positions described herein, other lifting assemblies may be used. For example, pneumatic systems well known in the art can be substituted for the elements of the hydraulic cylinder assembly 24 and used to cause the upper and lower arms 22, 22, 20, 20 to be moved.

The hoist 12 comprises a retracted condition, as shown, for example, in FIG. 1 and an extended condition, as shown, for example in FIG. 2. In the retracted condition, the lower arms 20, 20 are positioned such that the lower arm distal ends 38 are adjacent to an inside portion of the frame 16 and the upper arms crossmember 26 is adjacent to the base 18. In the extended condition, the lower arms 20, 20 are positioned such that the lower arm distal ends 38 are above the frame 16 and the upper arms crossmember 26 is raised well above the base 18.

Although the drawings depict several components of the hoist 12 as being angular, the hoist 12 need not comprise angular components. For example, the base 18, lower arms 20, 20 and upper arms 22, 22 can comprise tubular elements.

Although in the preferred embodiment, the supplemental support systems 14 are coupled to respective lower legs 20, 20, the supplemental support system 14 need not be so coupled. Rather, in other embodiments, the supplemental support system 14 may be coupled to one or both upper legs 22, 22 such that the pin 44, in the supporting position rests against the lower leg 20, 20.

In preferred embodiments, the hoist 12 and supplemental support 14 are formed from heavy duty steel adapted to withstand heavy loads. However, the hoist 12 can be form from any suitable material known in the art and need not be constructed from steel.

The use of the hoist 12 and supplemental support systems 14 will now be discussed. The hoist 12 is adapted to be mounted to a truck frame 16 and truck bed. In preferred embodiments, the base 18 is mounted to the truck frame 16 and the upper arms crossmember 26 is pivotally mounted to a crossmember axle spanning between support members of the truck bed. The hydraulic cylinder assembly 24 is operatively connected to a source of hydraulic fluid and a pump structured and arranged to move such fluid into and out of the barrel 66 and otherwise activate the hoist 12 as required by a user.

With the hoist 12 in the retracted position such that the truck bed is generally parallel to the truck frame 16, the user, by activating the hydraulic fluid pump, can cause fluid to enter the barrel of the hydraulic cylinder assembly 24. Such entry of fluid causes the piston rod 52 to extend which, in turn, causes the hoist 12 to move from the retracted condition depicted in FIG. 1 to the extended condition depicted in FIG. 2. This movement causes the truck bed to move upward so as to permit, for example, the user to dump contents of the truck bed.

Figure 4:
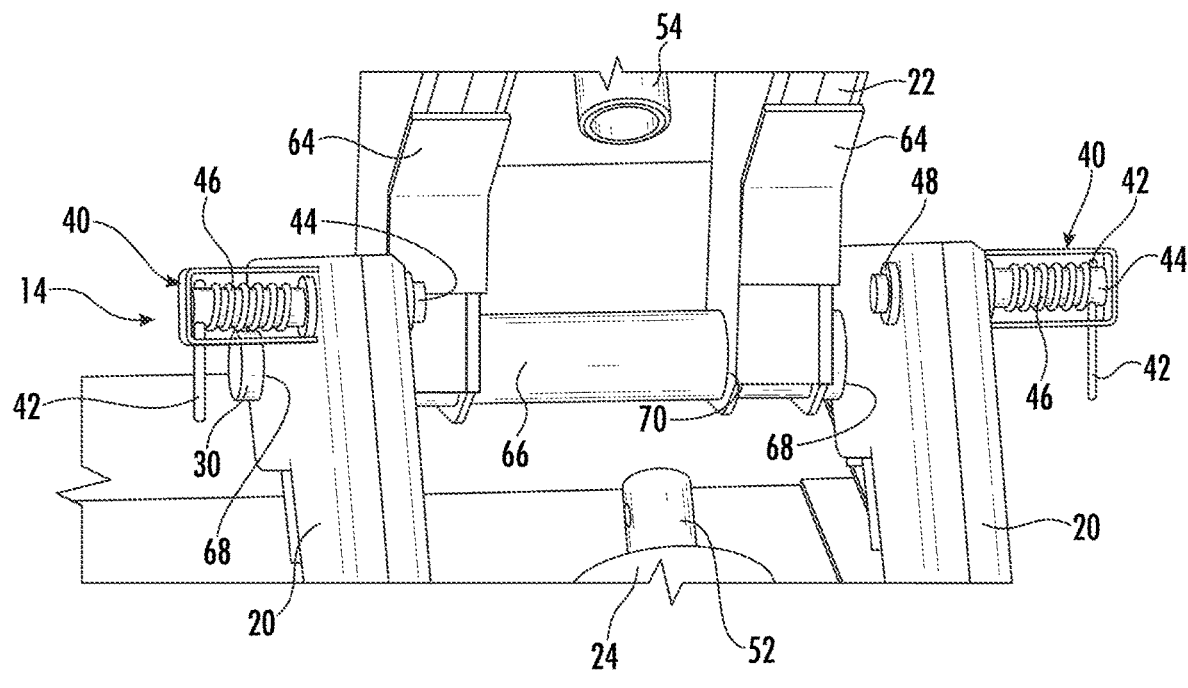
FIG. 4 is a front and left-side isometric view of the supplemental support system portions of the hoist of FIGS. 1 and 2 with the pins in the non-supporting position.
Figure 5:
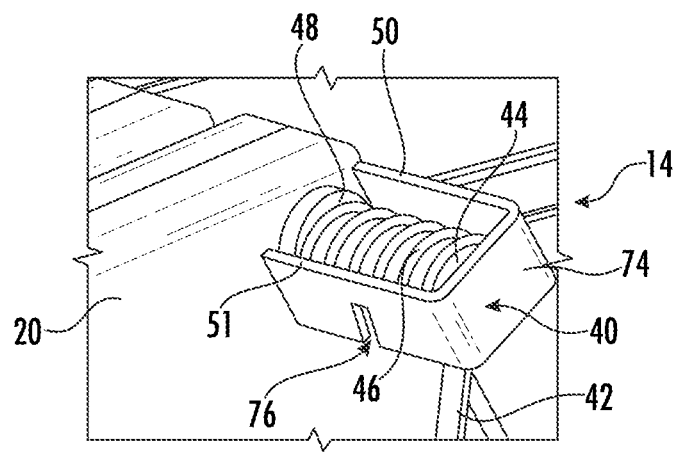
FIG. 5 is close up view of the right pin latch assembly of FIGS. 1-4.

With the hoist 12 in such extended condition, the user may then, grasp the pin handle 42 of each spring assisted pin support system 14 and move the pins 44 from the non-supporting positions depicted in FIG. 4 to the supporting positions of FIG. 3. The pins 44 are retained in place by the pin handle 38 being positioned within the notch 76. With the pin 44 in such supporting position, the upper arm 22 is prevented from moving downward past the pin 44 to, for example, the retracted position. Therefore, should the hydraulic cylinder assembly 24 be inadvertently activated so as to attempt to lower the hoist 12 or if hydraulic pressure were to be otherwise lost, the lower arms 20, 20 and upper arms 22, 22, together with the truck bed, would remain in the extended condition.

The procedure for lowering the hoist 12 from the extended position to the retracted position is generally the reverse of that described above. To do so, the user, by grasping the pin handle 42 of each supplemental support system 14 and removing the pin handles 42 from each notch 76, moves the pins 44 from the supporting positions depicted in FIG. 3 to the non-supporting positions of FIG. 4. As the spring 46 biases the pin 44 towards the non-supporting position when the pin handle 42 is removed from the notch 76, the user can easily return the pins 44 to their non-supporting positions. The user then, by activating the hydraulic fluid pump, can cause fluid to exit the barrel 66 of the hydraulic cylinder assembly 24. Such exit of fluid causes the piston rod 52 to retract which in turn causes the hoist 12 to move from the extended condition depicted in FIG. 2 to the retracted condition depicted in FIG. 1. This movement causes the truck bed to move downward so as to permit, for example, the truck to be driven safely.

The foregoing disclosure and showings made in the drawings are merely illustrative of the principles of this invention and are not to be interpreted in a limiting sense. While there has been illustrated and described what is, at present, considered to be a preferred embodiment of the present invention, it will be understood by those skilled in the art that various changes and modifications may be made, and equivalents may be substituted for elements thereof without departing from the true scope of the invention. Therefore, it is intended that this invention not be limited to the particular embodiment disclosed as the best mode contemplated for carrying out the invention, but that the invention will include all embodiments falling within the scope of this disclosure and the claims.

The invention claimed is:

1. A support assembly comprising:
 a bracket, a blocking member, and a spring, the bracket being adapted to be fixed to a support member comprising a through opening;
 the through opening comprising first and second through opening ends, such that when the bracket is fixed to the support member, the second through opening end is nearer to the bracket than the first through opening end;
 the blocking member comprising first and second blocking member ends;
 the bracket comprising first and second legs and a bracket end portion, the bracket end portion spanning between the first and second legs;
 when fixed to the support member, the bracket being adapted to:
  retain the blocking member, at least partially, within the through opening such that:
   the first end of the blocking member is positioned within the through opening or beyond the first through opening end;
   the second end of the blocking member is positioned within a space defined by the bracket legs and the bracket end portion;

the bracket end portion prevents any portion of the second end of the blocking member to move beyond the bracket end portion; and prevent the second end of the blocking member from exiting the space defined by the bracket legs and the bracket end portion;

the blocking member structured and arranged to be axially aligned with the through opening when the bracket is fixed to the support member such that a sliding portion of the blocking member is adapted to slidingly move within the through opening while the second end of the blocking member is retained within the space defined by the bracket legs and the bracket end portion;

the blocking member being adapted to be selectively moved from a supporting position to a non-supporting position.

2. The support assembly of claim 1, wherein the blocking member is a pin.

3. The support assembly of claim 2, wherein the spring comprises a helical compression spring and wherein the spring surrounds the pin such that the spring and pin are axially aligned.

4. The support assembly of claim 3, wherein the spring is adapted to axially bias the blocking member towards the bracket end portion such that the blocking member is biased towards the non-supporting position.

5. The support assembly of claim 2, further comprising a handle coupled to the pin.

6. The support assembly of claim 5, wherein at least one of the bracket legs comprises a notch adapted to receive the handle.

7. The support assembly of claim 6, wherein the blocking member is in the supporting position when the handle is positioned within the notch.

8. The support assembly of claim 1, wherein the blocking member is adapted to support a portion of a hoist when the blocking member is in the supporting position.

9. The support assembly of claim 1, wherein, when the blocking member is slidingly moved within the through opening, the sliding portion of the blocking member is capable of axial rotation about a longitudinal axis of the blocking member.

10. A support assembly comprising:
a bracket, a blocking member, a spring, and a support member, the support member comprising a through opening, the bracket being fixed to the support member;
the through opening comprising first and second through opening ends, such that when the bracket is fixed to the support member, the second through opening end is nearer to the bracket than the first through opening end;
the blocking member comprising first and second blocking member ends;
the bracket comprising first and second legs and a bracket end portion, the bracket end portion spanning between the first and second legs;
the bracket being adapted to:
retain the blocking member, at least partially within the through opening such that:
the first end of the blocking member is positioned within the through opening or beyond the first through opening end;
the second end of the blocking member is positioned within a space defined by the bracket legs and the bracket end portion;
the bracket end portion prevents any portion of the second end of the blocking member to move beyond the bracket end portion; and
prevent the second end of the blocking member from exiting the space defined by the bracket legs and the bracket end portion;
the blocking member being axially aligned with the through opening such that a sliding portion of the blocking member is adapted to slidingly move within the through opening while the second end of the blocking member is retained within the space defined by the bracket legs and the bracket end portion;
the blocking member being adapted to be selectively moved from a supporting position to a non-supporting position.

11. The support assembly of claim 10, wherein the blocking member is a pin.

12. The support assembly of claim 11, wherein the spring comprises a helical compression spring and wherein the spring surrounds the pin such that the spring and pin are axially aligned.

13. The support assembly of claim 12, wherein the spring is adapted to axially bias the blocking member towards the bracket end portion such that the blocking member is biased towards non-supporting position.

14. The support assembly of claim 12, further comprising a handle coupled to the pin.

15. The support assembly of claim 14, wherein at least one of the bracket legs comprises a notch adapted to receive the handle.

16. The support assembly of claim 15, wherein the blocking member is in the supporting position when the handle is positioned within the notch.

17. The support assembly of claim 10, wherein the support member is a lower arm of a hoist.

18. The support assembly of claim 17, wherein the blocking member supports an upper arm of the hoist when the blocking member is in the supporting position.

19. The support assembly of claim 10, wherein, when the blocking member is slidingly moved within the through opening, the sliding portion of the blocking member is capable of axial rotation about a longitudinal axis of the blocking member.

* * * * *